United States Patent [19]

Pruett

[11] Patent Number: 4,493,455
[45] Date of Patent: Jan. 15, 1985

[54] ADJUSTABLE THERMOSTAT VALVE SYSTEM FOR AUTOMOTIVE VEHICLES

[76] Inventor: Larry S. Pruett, P.O. Box 1358, Marietta, Ga. 30061

[21] Appl. No.: 502,108

[22] Filed: Jun. 8, 1983

[51] Int. Cl.³ .............................................. F01P 7/14
[52] U.S. Cl. ................................ 236/34.5; 123/41.08; 236/51; 337/309
[58] Field of Search .................... 236/84, 34.5, 51; 337/309–311, 383; 340/685; 200/56 A; 123/41.08

[56] References Cited

U.S. PATENT DOCUMENTS

| | | | |
|---|---|---|---|
| 1,789,548 | 1/1931 | Heap | 340/688 X |
| 2,277,598 | 3/1942 | McCollum | 236/34 X |
| 2,750,117 | 6/1956 | Pascolini | 236/34 |
| 2,833,478 | 5/1958 | Middleton | 236/34 |
| 2,923,786 | 2/1960 | Jones | 340/688 X |
| 2,975,976 | 3/1961 | Smith et al. | 236/84 X |
| 3,451,026 | 6/1969 | Siri et al. | 200/56 A X |
| 4,016,536 | 4/1977 | La Chapelle | 340/688 X |
| 4,393,819 | 7/1983 | Tanaka et al. | 236/34.5 X |
| 4,399,775 | 8/1983 | Tanaka et al. | 236/34.5 X |

Primary Examiner—William E. Tapolcai

[57] ABSTRACT

This automobile thermostat valve system is designed to take the place of the common thermostat, so as to enable an automobile to run efficiently in any part of the world where there are various temperature differences. Primarily, it consists of a temperature sensing plug, an electronic temperature reading gauge, a control switch for setting the gauge to the desired temperature range, and a modified thermostat, which is vacuum operated to control the valve stem, which controls the water flow in the engine block and radiator of the automobile.

1 Claim, 2 Drawing Figures

ADJUSTABLE THERMOSTAT VALVE SYSTEM FOR AUTOMOTIVE VEHICLES

This invention relates to thermostats, and more particularly, to an adjustable thermostat valve system for automotive vehicles.

The principal object of this invention is to provide an adjustable thermostat valve system for automotive vehicles, which will be installed during the mass production of such vehicles, instead of the installation of different thermostats in engines for operation in different climate areas of the world, which malfunction before long, anyway.

Another object of this invention is to provide an adjustable thermostat valve system for automotive vehicles, which will be a uniform type, that will be employed in all vehicles, because all one will have to do, is to set it according to the temperature constants of the area in which it is going to operate.

Another object of this invention is to provide an adjustable thermostat valve, which can be further adjusted for winter and summer driving, so as to enable the vehicle's engine to operate much more efficiently than was formally possible with thermostats of the prior art.

A further object of this invention is to provide an adjustable thermostat valve system for automotive vehicles, which will be quickly and easily adjustable to a desired temperature range.

Other objects are to provide a adjustable thermostat valve system for automotive vehicles, which is simple in design, inexpensive to manufacture, rugged in construction, easy to use, and efficient in operation.

These, and other objects, will be readily evident, upon a study of the following specification, and the accompanying drawing, wherein.

Figure 2:
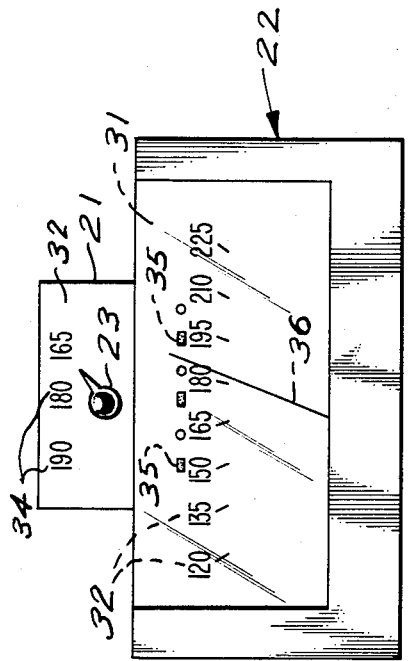
FIG. 2 is a front elevational view of the dashboard mounted gauge of the invention.
Figure 1:
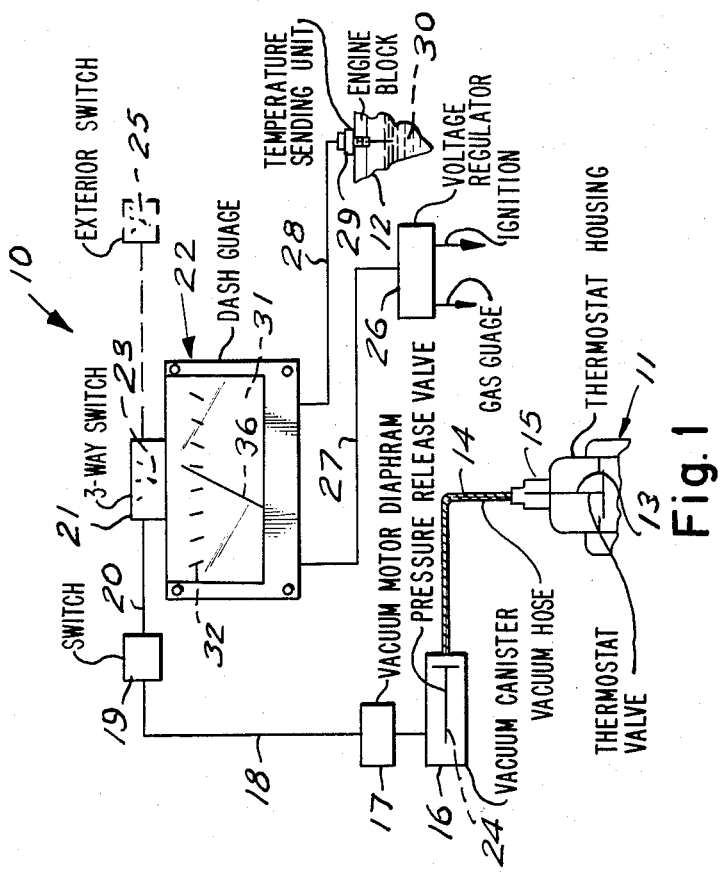
FIG. 1 is a schematic diagram of the present invention.

Accordingly, a valve system 10 is shown to include a suitable valve housing 11, mounted in the engine block 12, in place of the former thermostat valve, and it should be noted, that housing 11 is similar in structure to the obsolete thermostat valve housing, with the exception, that the valve stem 13, now employed, is vacuum operated by a vacuum hose 14, secured to the neck 15 of housing 11 at one end, and secured, at its opposite end, to a vacuum canister 16, which is coupled to a vacuum motor diaphragm 17. The vacuum motor diaphragm 17 is suitably coupled, by cable 18, to relay switch 19, which is coupled, by cable 20, to a three-way switch 21, that is mounted to electronic temperature gauge 22, and is operated manually by control knob 23, for a purpose which hereinafter will be described. Vacuum canister 16 includes a pressure release valve 24, which is common in the art, and an exterior control switch 25 may be coupled to gauge 22, which is optional, and is used in place of switch 21, if desired. Gauge 22 is a typical electronic instrument, which has its coil (not shown) feed by current through voltage regulator 26 of the vehicle, by cables 27 and 28, the cable 28 being connected to the temperature sending unit 29, which is a plug, suitably threaded into the engine block 12, where it senses the temperature of the coolant 30 of the engine.

The face 31 of gauge 22 is calibrated with numerical characters 32, which read from 120 degrees to 225 degrees in temperature, which are the conversion increments of current read-out of electronic gauge or instrument 22. On the adjustable switch face 33 are numerical characters 34, which are the temperature settings for system 10, and in the face 31 of gauge 22 are electrical contacts 35, for engagement with pointer arm 36, which serves as an internal switch arm to close the circuit of the relay switch 19, which will cause the valve stem 13 to unseat, and enable circulation of the coolant 30 through the radiator of the engine of the vehicle, in which system 10 is installed. The temperature settings or numerical characters 34 of control switch 21 are controlled by knob 23, and are internally wired to their appropriate contacts 35 in gauge 22, in a manner known in the art, so as to cooperate with the electrical contacts 35, to set system 10 for any climatic region in the world.

In operation, the thermostat housing 11 is, first, installed in the existing opening of the engine, where the obsolete thermostat was located. The unit or plug 29 is next installed in an opening drilled and tapped into the engine block 12, so as to be in contact with the engine coolant 30. The hose 14 is then coupled to housing 11 and vacuum canister 16, that is coupled to vacuum motor diaphragm 17, and the diaphragm 17 is coupled to the relay switch 19, by cable 18. After the above mentioned, the switch 19 is coupled to the three-way switch 21 of gauge 22, which is suitably mounted in the dashboard of the vehicle, or is magnetically mounted to the top of the dashboard. The cable 27 is properly connected to the current side of the voltage regulator 26, and the cable 28 is suitably connected to the unit 29, and the system 10 is then ready for the proper temperature setting appropriate for the climate in which the vehicle is intended to be operated. The gauge 22 constantly gives the correct running temperature of the engine, by being connected to the unit 29, which is a heat sensor. The control switch 21 is set to the appropriate temperature setting on its face 32, which corresponds to a related contact 35 in gauge 22, depending upon the local climate of the region, and, as the temperature of the engine causes the needle or pointer arm 36 to move towards the hot side of the gauge 22, arm 36 will connect with whichever contact 35 on which the three-way control switch 21 is set. The abovementioned will cause switch 19 to close and operate the vacuum motor diaphragm 17, which will open the valve, by means of the valve stem 13, thus enabling the coolant 30 to circulate, and cool the engine down. When the pointer arm 36 moves to the cold side of the gauge 22, the switch 19 will cause the valve to close.

It shall also be noted, that secondary contacts points may be employed at a certain amount of degrees, adjacent the other contacts 35, so as to make the valve stay open until the needle or ar 36 drops to that point, and then closes the circuit, such as in the operation of a sign or light timer.

It shall also be recognized, that a thermocouple may be employed under the hottest running engine cylinder spark plug, to provide micro-ampere current to a transistorized circuit, which will be adjustable to effect temperature settings of a thermostat, to cool an engine effectively in different climatic regions of the world; the abovementioned also employing a visual temperature read-out display instrument or gauge, such as was heretofore described of gauge 12 of system 10.

While various changes may be made in the detail construction, it is understood that such changes will be within the spirit and scope of the present invention, as is defined by the appended claims.

What I now claim is:

1. An adjustable thermostat valve system for automotive vehicles, comprising, in combination, a valve housing mounted on an engine block, a vacuum operated valve stem in said housing operated by a vacuum hose secured at one end to a neck of said housing and to a vacuum canister at its other end, a vacuum motor diaphragm coupled to said vacuum canister by a cable, said diaphragm coupled to a relay switch coupled by cable to a three-way switch mounted on an electronic temperature gauge; a pressure release valve in said vacuum canister, cable to said temperature gauge being connected to a voltage regulator of said vehicle, and another cable to said temperature gauge being connected to a temperature sending plug threaded in said engine block; a face on said temperature gauge being calibrated in temperature degrees, a plurality of electric contacts at spaced locations along the calibrations of said face, a pointer arm in front of said face being engageable with said contacts for closing a circuit to said relay switch and causing said valve stem to insert and enable coolant circulation through a radiator of said vehicle; and a manually controlled knob on said three-way switch for electing a temperature at which said circuit between said temperature gauge and said relay switch is closable.

* * * * *